J. Ives,
Harness Saddle.
Nº 15,077.   Patented June 10, 1856.
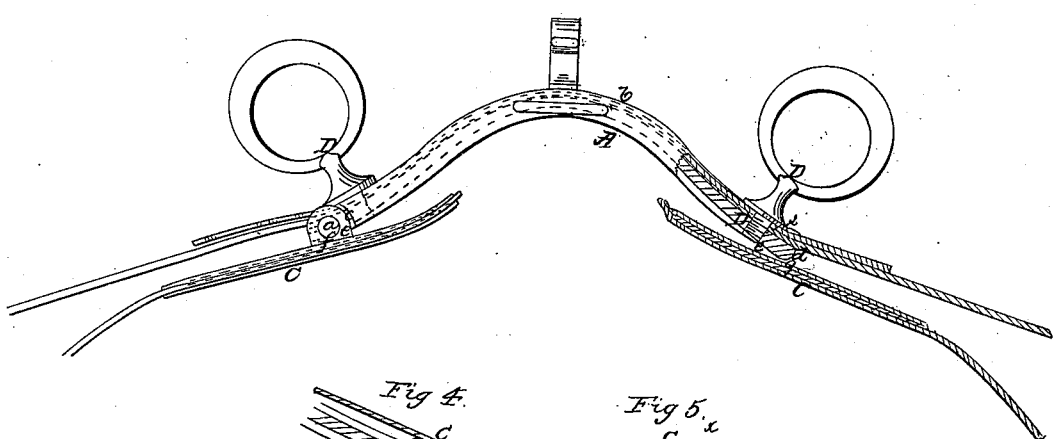

UNITED STATES PATENT OFFICE.

JAMES IVES, OF MOUNT CARMEL, CONNECTICUT.

MODE OF ATTACHING PADS TO SADDLETREES.

Specification of Letters Patent No. 15,077, dated June 10, 1856.

*To all whom it may concern:*

Be it known that I, JAMES IVES, of Mount Carmel, in the county of New Haven and State of Connecticut, have invented a new and useful Improvement in the Manner of Attaching Pads to Trees; and I do hereby declare that the following is a full, clear, and exact description of the same, reference being had to the accompanying drawings, forming part of this specification, in which—

Figure 1, is a front elevation and partial section of a pad-tree having the pads attached to its after my invention. Fig. 2, is a plan and partial section. Fig. 3, an inverted plan, the position of the pad being reversed. Fig. 4, is a vertical longitudinal section of one of the pads and portion of the tree through the line $x$, $x$, in Figs. 2 and 5. Fig. 5, is a transverse section through the line $y$, $y$, in Fig. 4.

Similar letters of reference indicate corresponding parts in the several figures.

My invention relates to an improvement in the present method of connecting self-adjusting pads to the tree, and the nature of the same consists in the peculiar construction of the hinge joint, hereinafter described, for effecting said connection, whereby increased simplicity, facility for manufacture, cheapness, durability and neatness are secured as will be presently shown.

To enable those skilled in the art to make and use my invention, I will proceed to describe it.

A, is a pad tree of the usual shape. On each end of the same, I cast short journals $a$, $a^1$, between which and the beads $b$, $b$, on the front and back of the tree; transverse spaces, $c$, $c$, of the width of said beads, are left, as shown, for the ears or bearings of the pad to play in. I also reduce the metal, as at $d$, by filing an open groove or slot on the underside of the end of the tree, contiguous to the journal $a'$.

D, D, are the turrets which screw into holes $D^1$ formed in the end of the tree.

C, represents the pad; on its upper side, two ears or bearings $e$, $e^1$ having circular holes $f$, $f'$, to receive the journals, are cast, as shown in Fig. 5.

$g$, is a slot, cut in the ear or bearing $e^1$, and communicating with the circular hole $f^1$, of the same, as shown in Figs. 1 and 2.

To connect the pad to the tree after the manner shown in Figs. 1, 2 and 3, it is simply necessary to adjust it, as shown in Fig. 4, so as to bring the open slot $g$, opposite to the thin portion, $d$, of the tree, as shown in Figs. 4 and 5, in black lines and in Fig. 3 in dotted lines, and, when in this position, to move it in a longitudinal direction toward the tree till it occupies the position shown in red in Fig. 3, and the circular holes $f$, $f^1$, come opposite the journals $e$, $e^1$, and then to move it laterally in a manner to cause the journals to enter the holes $f$, $f^1$ as shown in black lines in Figs. 2 and 3. The pad is now turned down to the position shown in Figs. 1 and 2, and by being thus turned down is effectually prevented from getting loose from the tree, owing to the slot $g$, being shifted from the position shown in Figs. 4, to the position shown in Fig. 2, and the solid portions of the ears or bearings $e$, $e^1$, coming opposite or against the front and rear edges of the tree as at 2, 2,—and prevented thereby from having horizontal play either backward or forward.

After the pads are connected to the tree the turrets D, D, are screwed in; they, however, do not serve for supporting and confining the pads, as in the tree, at present in use, and therefore in case they should fall out, there is no danger of the pad separating, whereas with the tree in use if the turrets fall out, the pads also disconnect and fall to the ground.

Constructing the hinge joint as herein described, enables me to have a perfectly smooth face pad-plate also to have the strap which passes over the top of the tree, lie much more evenly, and thus, a neater article is produced. It likewise avoids the employment of a number of the parts at present used in connecting the pad to the tree, and thus, a saving in expense is effected, and greater facility for finishing the tree by machinery secured, and withal, a much nicer and more durable bearing provided.

I do not claim a hinged self-adjusting pad, as such a device was patented in 1847 Feb. 5, by Pope and Frasier, but What I do claim as my invention, and desire to secure by Letters Patent, is, The peculiar construction of hinge joint herein described and shown, for connecting the pad to the tree, substantially as set forth.

JAMES IVES.

Witnesses:

WM. W. STONE,
CHARLES ROBINSON.